US00RE35512E

United States Patent [19]

Nowak et al.

[11] E Patent Number: Re. 35,512

[45] Reissued Date of Patent: *May 20, 1997

[54] LITHOGRAPHIC PRINTING MEMBERS FOR USE WITH LASER-DISCHARGE IMAGING

[75] Inventors: Michael T. Nowak, Leominster, Mass.; Thomas E. Lewis, Hampstead, N.H.

[73] Assignee: Presstek, Inc., Hudson, N.H.

[ * ] Notice: The portion of the term of this patent subsequent to Aug. 23, 2011, has been disclaimed.

[21] Appl. No.: 530,526

[22] Filed: Sep. 19, 1995

Related U.S. Patent Documents

Reissue of:

[64] Patent No.: 5,379,698
Issued: Jan. 10, 1995
Appl. No.: 247,016
Filed: May 20, 1994

U.S. Applications:

[63] Continuation-in-part of Ser. No. 62,431, May 13, 1993, Pat. No. 5,339,737, which is a continuation-in-part of Ser. No. 917,481, Jul. 20, 1992, abandoned.

[51] Int. Cl.[6] ..... B41N 1/08

[52] U.S. Cl. ..... 101/454; 101/457

[58] Field of Search ..... 101/453, 454, 101/457–459, 463.1, 465–467, 401.1; 430/302–305

[56] References Cited

U.S. PATENT DOCUMENTS

| | | | |
|---|---|---|---|
| 3,506,779 | 4/1970 | Brown et al. | 178/6.6 |
| 3,654,864 | 4/1972 | Ovshinsky | 101/426 |
| 3,664,737 | 5/1972 | Lipp | 355/18 |
| 3,678,852 | 7/1972 | Feinleib et al. | 101/465 |
| 3,745,235 | 7/1973 | Bestenreiner et al. | 178/5.2 R |
| 3,760,175 | 9/1973 | Gibson et al. | 240/1 |
| 3,780,358 | 12/1973 | Thompson | 317/235 |
| 3,803,511 | 4/1974 | Thompson | 331/94.5 |
| 3,832,718 | 8/1974 | Berkowitz et al. | 346/74 |
| 3,836,709 | 9/1974 | Hutchison | 178/6.7 |
| 3,911,376 | 10/1975 | Thompson | 331/94.5 |
| 3,945,318 | 3/1976 | Landsman | 101/467 |
| 3,962,513 | 6/1976 | Eames | 428/323 |
| 3,964,389 | 6/1976 | Peterson | 101/467 |
| 3,985,953 | 10/1976 | Dunkley | 178/6.6 |
| 4,020,762 | 5/1977 | Peterson | 101/467 |
| 4,046,986 | 9/1977 | Barker | 219/121 |

(List continued on next page.)

FOREIGN PATENT DOCUMENTS

| | | | |
|---|---|---|---|
| 1050805 | 3/1979 | Canada . | |
| 0573091 | 12/1993 | European Pat. Off. . | |
| 0573092 | 12/1993 | European Pat. Off. . | |
| 3714157 | 11/1988 | Germany . | |
| 235789 | 9/1990 | Japan | 101/467 |
| 3197190 | 8/1991 | Japan . | |
| 3197191 | 8/1991 | Japan . | |
| 3197192 | 8/1991 | Japan . | |
| 5-8367 | 1/1993 | Japan . | |
| WO9207716 | 5/1992 | WIPO . | |
| WO9401280 | 1/1994 | WIPO . | |

OTHER PUBLICATIONS

*Molecular And Dynamic Studies On Lase Abalation Of Doped Polymer Systems,* 17 Polymer News (1991).

E.B. Cargill et al., *A Report On Polaroid's New Dry Imaging Technology For Generating 8×10 Radiographic Films* (Jan. 1993).

E.B. Cargill et al., *A Report On The Image Quality Characteristics Of The Polaroid Helios Laser System* (Oct. 1992).

Leenders & Peeters, "Method and material for the production of a dry planographic printing plate," *Research Disclosure,* Apr. 1980, at p. 131.

Nechiporenko et al., "Direct Method of Producing Waterless Offset Plates By Controlled Laser Beam".

*Primary Examiner*—Stephen R. Funk
*Attorney, Agent, or Firm*—Cesari and McKenna

[57] ABSTRACT

Lithographic printing plates suitable for imaging by means of laser devices that emit in the near-infrared region. Laser output either ablates one or more plate layers or physically transforms a surface layer, in either case resulting in an imagewise pattern of features on the plate. The image features exhibit an affinity for ink or an ink-abhesive fluid that differs from that of unexposed areas.

31 Claims, 6 Drawing Sheets

U.S. PATENT DOCUMENTS

| | | | |
|---|---|---|---|
| 4,054,094 | 10/1977 | Caddell et al. | 101/467 |
| 4,132,168 | 1/1979 | Peterson | 101/471 |
| 4,132,826 | 1/1979 | Dessauer et al. | 101/465 |
| 4,149,798 | 4/1979 | McGowan et al. | 355/8 |
| 4,212,672 | 7/1980 | Mihara et al. | 430/494 |
| 4,245,003 | 1/1981 | Oransky et al. | 428/323 |
| 4,247,611 | 1/1981 | Sander et al. | 430/286 |
| 4,334,003 | 6/1982 | Jones | 430/156 |
| 4,347,785 | 9/1982 | Chase et al. | 101/1 |
| 4,390,610 | 6/1983 | Bowden et al. | 430/58 |
| 4,395,946 | 8/1983 | Price | 101/152 |
| 4,458,994 | 7/1984 | Jain et al. | 354/4 |
| 4,460,831 | 7/1984 | Oettinger et al. | 250/494.2 |
| 4,492,750 | 1/1985 | Law et al. | 430/494 |
| 4,501,811 | 2/1985 | Saikawa et al. | 430/204 |
| 4,504,141 | 3/1985 | Yamakoshi | 355/77 |
| 4,550,061 | 10/1985 | Sachdev et al. | 428/461 |
| 4,588,674 | 5/1986 | Stewart et al. | 430/273 |
| 4,592,977 | 6/1986 | Naganuma et al. | 430/18 |
| 4,599,295 | 7/1986 | Kondo et al. | 430/156 |
| 4,622,179 | 11/1986 | Eda | 540/139 |
| 4,628,813 | 12/1986 | Hasegawa et al. | 101/116 |
| 4,675,357 | 6/1987 | Welch | 524/406 |
| 4,711,834 | 12/1987 | Butters et al. | 430/201 |
| 4,718,340 | 1/1988 | Love, III | 101/116 |
| 4,729,310 | 3/1988 | Love, III | 101/157 |
| 4,731,317 | 3/1988 | Fromson et al. | 430/159 |
| 4,743,091 | 5/1988 | Gelbart | 350/252 |
| 4,749,840 | 6/1988 | Piwczyk | 219/121 |
| 4,784,933 | 11/1988 | Kanada et al. | 430/204 |
| 4,788,514 | 11/1988 | Fox | 332/7.51 |
| 4,872,189 | 10/1989 | Frankel et al. | 378/119 |
| 4,877,480 | 10/1989 | Das | 156/635 |
| 4,881,231 | 11/1989 | Jain | 372/32 |
| 4,911,075 | 3/1990 | Lewis et al. | 101/453 |
| 4,917,454 | 4/1990 | Feder | 250/227.23 |
| 4,918,304 | 4/1990 | Gordon | 250/227.26 |
| 4,948,699 | 8/1990 | Nishinoiri et al. | 430/204 |
| 4,975,728 | 12/1990 | Gordon | 355/1 |
| 4,975,729 | 12/1990 | Gordon | 355/1 |
| 5,011,261 | 4/1991 | Gordon | 350/96.25 |
| 5,015,064 | 5/1991 | Detig et al. | 350/96.24 |
| 5,082,799 | 1/1992 | Hornstrom et al. | 437/129 |
| 5,093,147 | 3/1992 | Andrus et al. | 427/7 |
| 5,093,832 | 3/1992 | Bethune et al. | 372/21 |
| 5,095,491 | 3/1992 | Kozlovsky et al. | 372/94 |
| 5,101,414 | 3/1992 | Schilling et al. | 372/50 |
| 5,102,758 | 4/1992 | Kazmaier et al. | 430/58 |
| 5,107,509 | 4/1992 | Esterowitz et al. | 372/20 |
| 5,156,938 | 10/1992 | Foley et al. | 430/200 |
| 5,171,650 | 12/1992 | Ellis et al. | 430/20 |
| 5,366,844 | 11/1994 | Verburgh et al. | 430/258 |
| 5,378,580 | 1/1995 | Leenders | 101/467 |
| 5,437,963 | 8/1995 | Verburgh et al. | 430/262 |

LITHOGRAPHIC PRINTING MEMBERS FOR USE WITH LASER-DISCHARGE IMAGING

Matter enclosed in heavy brackets [ ] appears in the original patent but forms no part of this reissue specification; matter printed in italics indicates the additions made by reissue.

RELATED APPLICATION

This is a continuation-in-part of Ser. No. 08/062,431, filed on May 13, 1993, now U.S. Pat. No. 5,339,737 which is itself a continuation-in-part of Ser. No. 07/917,481, filed on Jul. 20, 1992, now abandoned.

BACKGROUND OF THE INVENTION

A. Field of the Invention

The present invention relates to digital printing apparatus and methods, and more particularly to a system for imaging lithographic printing plates on- or off-press using digitally controlled laser output.

B. Description of the Related Art

Traditional techniques of introducing a printed image onto a recording material include letterpress printing, gravure printing and offset lithography. All of these printing methods require a plate, usually loaded onto a plate cylinder of a rotary press for efficiency, to transfer ink in the pattern of the image. In letterpress printing, the image pattern is represented on the plate in the form of raised areas that accept ink and transfer it onto the recording medium by impression. Gravure printing cylinders, in contrast, contain series of wells or indentations that accept ink for deposit onto the recording medium; excess ink must be removed from the cylinder by a doctor blade or similar device prior to contact between the cylinder and the recording medium.

In the case of offset lithography, the image is present on a plate or mat as a pattern of ink-accepting (oleophilic) and ink-repellent (oleophobic) surface areas. In a dry printing system, the plate is simply inked and the image transferred onto a recording material; the plate first makes contact with a compliant intermediate surface called a blanket cylinder which, in turn, applies the image to the paper or other recording medium. In typical sheet-fed press systems, the recording medium is pinned to an impression cylinder, which brings it into contact with the blanket cylinder.

In a wet lithographic system, the non-image areas are hydrophilic, and the necessary ink-repellency is provided by an initial application of a dampening (or "fountain") solution to the plate prior to inking. The ink-abhesive fountain solution prevents ink from adhering to the non-image areas, but does not affect the oleophilic character of the image areas.

If a press is to print in more than one color, a separate printing plate corresponding to each color is required, each such plate usually being made photographically as described below. In addition to preparing the appropriate plates for the different colors, the operator must mount the plates properly on the plate cylinders of the press, and coordinate the positions of the cylinders so that the color components printed by the different cylinders will be in register on the printed copies. Each set of cylinders associated with a particular color on a press is usually referred to as a printing station.

In most conventional presses, the printing stations are arranged in a straight or "in-line" configuration. Each such station typically includes an impression cylinder, a blanket cylinder, a plate cylinder and the necessary ink (and, in wet systems, dampening) assemblies. The recording material is transferred among the print stations sequentially, each station applying a different ink color to the material to produce a composite multi-color image. Another configuration, described in U.S. Pat. No. 4,936,211 (co-owned with the present application and hereby incorporated by reference), relies on a central impression cylinder that carries a sheet of recording material past each print station, eliminating the need for mechanical transfer of the medium to each print station.

With either type of press, the recording medium can be supplied to the print stations in the form of cut sheets continuous "web" of material. The number of print stations on a press depends on the type of document to be printed. For mass copying of test or simple monochrome line-art, a single print station may suffice. To achieve full tonal rendition of more complex monochrome images, it is customary to employ a "duotone" approach, in which two stations apply different densities of the same color or shade. Full-color presses apply ink according to a selected color model, the most common being based on cyan, magenta, yellow and black (the "CMYK" model). Accordingly, the CMYK model requires a minimum of four print stations; more may be required if a particular color is to be emphasized. The press may contain another station to apply spot lacquer to various portions of the printed document, and may also feature one or more "perfecting" assemblies that invert the recording medium to obtain two-sided printing.

The plates for an offset press are usually produced photographically. To prepare a wet plate using a typical negative-working subtractive process, the original document is photographed to produce a photographic negative. This negative is placed on an aluminum plate having a water-receptive oxides surface coated with a photopolymer. Upon exposure to light or other radiation through the negative, the areas of the coating that received radiation (corresponding to the dark or printed areas of the original) cure to a durable oleophilic state. The plate is then subjected to a developing process that removes the uncured areas of the coating (i.e., those which did not receive radiation, corresponding to the non-image or background areas of the original), exposing the hydrophilic surface of the aluminum plate.

A similar photographic process is used to create dry plates, which typically include an ink-abhesive (e.g., silicon) surface layer coated onto a photosensitive layer, which is itself coated onto a substrate of suitable stability (e.g., an aluminum sheet). Upon exposure to actinic radiation, the photosensitive layer cures to a state that destroys its bonding to the surface layer. After exposure, a treatment is applied to deactivate the photoresponse of the photosensitive layer in unexposed areas and to further improve anchorage of the surface layer to these areas. Immersion of the exposed plate in developer results in dissolution and removal of the surface layer at those portions of the plate surface that have received radiation, thereby exposing the ink-receptive, cured photosensitive layer.

Photographic platemaking processes tend to be time-consuming and require facilities and equipment adequate to support the necessary chemistry. To circumvent these shortcomings, practitioners have developed a number of electronic alternatives to plate imaging, some of which can be utilized on-press. With these systems, digitally controlled devices alter the ink-receptivity of blank plates in a pattern representative of the image to be printed. Such imaging devices include sources of electromagnetic-radiation pulses, produced by one or more laser or non-laser sources, that create chemical changes on plate blanks (thereby eliminating the need for a photographic negative); ink-jet equipment that directly deposits ink-repellent or ink-accepting spots on plate blanks; and spark-discharge equipment, in which an electrode in contact with or spaced close to a plate blank produces electrical sparks to physically alter the topology of the plate blank, thereby producing "dots" which collectively form a desired image (see, e.g., U.S. Pat. No. 4,911,075, co-owned with the present application and hereby incorporated by reference).

Because of the ready availability of laser equipment and their amenability to digital control, significant effort has been devoted to the development of laser-based imaging systems. Early examples utilized lasers to etch away material from a plate blank to form an intaglio or letterpress pattern. See, e.g., U.S. Pat. Nos. 3,506,779; 4,347,785. This approach was later extended to production of lithographic plates, e.g., by removal of a hydrophilic surface to reveal an oleophilic underlayer. See, e.g., U.S. Pat. No. 4,054,094. These systems generally require high-power lasers, which are expensive and slow.

A second approach to laser imaging involves the use of thermal-transfer materials. See, e.g., U.S. Pat. Nos. 3,945,318; 3,962,513; 3,964,389; and 4,395,946. With these systems, a polymer sheet transparent to the radiation emitted by the laser is coated with a transferable material. During operation the transfer side of this construction is brought into contact with an acceptor sheet, and the transfer material is selectively irradiated through the transparent layer. Irradiation causes the transfer material to adhere preferentially to the acceptor sheet. The transfer and acceptor materials exhibit different affinities for fountain solution and/or ink, so that removal of the transparent layer together with unirradiated transfer material leaves a suitably imaged, finished plate. Typically, the transfer material is oleophilic and the acceptor material hydrophilic. Plates produced with transfer-type systems tend to exhibit short useful lifetimes due to the limited amount of material that can effectively be transferred. In addition, because the transfer process involves melting and resolidification of material, image quality tends to be visibly poorer than that obtainable with other methods.

Finally, lasers can be used to expose a photosensitive blank for traditional chemical processing. See, e.g., U.S. Pat. Nos. 3,506,779; 4,020,762. In an alternative to this approach, a laser has been employed to selectively remove, in an imagewise pattern, an opaque coating that overlies a photosensitive plate blank. The plate is then exposed to a source of radiation, with the unremoved material acting as a mask that prevents radiation from reaching underlying portions of the plate. See, e.g., U.S. Pat. No. 4,132,168. Either of these imaging techniques requires the cumbersome chemical processing associated with traditional, non-digital platemaking.

DESCRIPTION OF THE INVENTION

Brief Summary of the Invention

The present invention enables rapid, efficient production of lithographic printing plates using relatively inexpensive laser equipment that operates at low to moderate power levels. The imaging techniques described herein can be used in conjunction with a variety of plate-blank constructions, enabling production of "wet" plates that utilize fountain solution during printing or "dry" plates to which ink is applied directly. As used herein, the term "plate" refers to any type of printing member or surface capable of recording an image defined by regions exhibiting differential affinities for ink and/or fountain solution; suitable configurations include the traditional planar or curved lithographic plates that are mounted on the plate cylinder of a printing press, but can also include seamless cylinders (e.g., the roll surface of a plate cylinder), an endless belt, or other arrangement.

A key aspect of the present invention lies in use of materials that enhance the ablative efficiency of the laser beam. Substances that do not heat rapidly or absorb significant amounts of radiation will not ablate unless they are irradiated for relatively long intervals and/or receive high-power pulses; such physical limitations are commonly associated with lithographic-plate materials, and account for the prevalence of high-power lasers in the prior art.

In one embodiment of our invention, a suitable plate construction includes a first layer and a substrate underlying the first layer, the substrate being characterized by efficient absorption of infrared ("IR") radiation, and the first layer and substrate having different affinities for ink (in a dry-plate construction) or an abhesive fluid for ink (in a wet-plate construction). Laser radiation is absorbed by the substrate, and ablates the substrate surface in contact with the first layer; this action disrupts the anchorage of the substrate to the overlying first layer, which is then easily removed at the points of exposure. The result of removal is an image spot whose affinity for the ink or ink-abhesive fluid differs from that of the unexposed first layer.

In a variation of this embodiment, the first layer, rather than the substrate, absorbs IR radiation. In this case the substrate serves a support function and provides contrasting affinity characteristics.

In both of these two-ply plate types, a single layer serves two separate functions, namely, absorption of IR radiation and interaction with ink or ink-abhesive fluid. In a second embodiment, which represents the primary subject of the present application, these functions are performed by two separate layers. The first, topmost layer is chosen for its affinity for (or repulsion of) ink or an ink-abhesive fluid. Underlying the first layer is a thin metal layer that absorbs IR radiation. A strong, stable substrate underlies the metal layer, and is characterized by an affinity for (or repulsion of) ink or an ink-abhesive fluid opposite to that of the first layer. Exposure of the plate to a laser pulse ablates the absorbing second layer, weakening the topmost layer as well. As a result of ablation of the second layer, the weakened surface layer is no longer anchored to an underlying layer, and is easily removed. The disrupted topmost layer (and any debris remaining from destruction of the absorptive second layer) is removed in a post-imaging cleaning step. This, once again, creates an image spot having a different affinity for the ink or ink-abhesive fluid than the unexposed first layer.

Post-imaging cleaning can be accomplished using a contact cleaning device such as a rotating brush (or other suitable means as described in U.S. Pat. No. 5,148,746, commonly owned with the present application and hereby incorporated by reference). Although post-imaging cleaning represents an additional processing step, the persistence of the topmost layer during imaging can actually prove beneficial. Ablation of the absorbing layer creates debris that can interfere with transmission of the laser beam (e.g., by depositing on a focusing lens or as an aerosol (or mist) of fine particles that partially blocks transmission). The disrupted but unremoved topmost layer prevents escape of this debris.

The printing members of the present invention are preferably manufactured for convenient bulk use on automatic plate-material dispensing equipment, such as that described in U.S. Pat. No. 5,355,795. Because in such arrangements rolled plate material is stored on a small-diameter core from which it is drawn tightly around the plate cylinder, it is important to utilize materials that are flexible and have low dynamic friction coefficients to accommodate free movement, but which also exhibit the durability required of a lithographic printing member.

The imaging apparatus of the present invention includes at least one laser device that emits in the IR, and preferably near-IR region; as used herein, "near-IR" means imaging radiation whose $lambda_{max}$ lies between 700 and 1500 nm. An important feature of the present invention is the use of solid-state lasers (commonly termed semiconductor lasers and typically based on gallium aluminum arsenide compounds) as sources; these are distinctly economical and convenient, and may be used in conjunction with a variety of imaging devices. The use of near-IR radiation facilitates use of a wide range of organic and inorganic absorption compounds and, in particular, semiconductive and conductive types.

Laser output can be provided directly to the plate surface via lenses or other beam-guilding components, or transmitted to the surface of a blank printing plate from a remotely sited laser using a fiber-optic cable. A controller and associated positioning hardware maintains the beam output at a precise orientation with respect to the plate surface, scans the output over the surface, and activates the laser at positions adjacent selected points or areas of the plate. The controller responds to incoming image signals corresponding to the original document or picture being copied onto the plate to produce a precise negative or positive image of that original. The image signals are stored as a bitmap data file on a computer. Such files may be generated by a raster image processor (RIP) or other suitable means. For example, a RIP can accept input data in page-description language, which defines all of the features required to be transferred onto the printing plate, or as a combination of page-description language and one or more image data files. The bitmaps are constructed to define the hue of the color as well as screen frequencies and angles.

The imaging apparatus can operate on its own, functioning solely as a platemaker,, or can be incorporated directly into a lithographic printing press. In the latter case, printing may commence immediately after application of the image to a blank plate, thereby reducing press set-up time considerably. The imaging apparatus can be configured as a flatbed recorder or as a drum recorder, with the lithographic plate blank mounted to the interior or exterior cylindrical surface of the drum. Obviously, the exterior drum design is more appropriate to use in situ, on a lithographic press, in which case the print cylinder itself constitutes the drum component of the recorder or plotter.

In the drum configuration, the requisite relative motion between the laser beam and the plate is achieved by rotating the drum (and the plate mounted thereon) about its axis and moving the beam parallel to the rotation axis, thereby scanning the plate circumferentially so the image "grows" in the axial direction. Alternatively, the beam can move parallel to the drum axis and, after each pass across the plate, increment angularly so that the image on the plate "grows" circumferentially. In both cases, after a complete scan by the beam, an image corresponding (positively or negatively) to the original document or picture will have been applied to the surface of the plate.

In the flatbed configuration, the beam is drawn across either axis of the plate, and is indexed along the other axis after each pass. Of course, the requisite relative motion between the beam and the plate may be produced by movement of the plate rather than (or in addition to) movement of the beam.

Regardless of the manner in which the beam is scanned, it is generally preferable (for reasons of speed) to employ a plurality of lasers and guide their outputs to a single writing array. The writing array is then indexed, after completion of each pass across or along the plate, a distance determined by the number of beams emanating from the array, and by the desired resolution (i.e., the number of image points per unit length).

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

1. Imaging Apparatus a. Exterior-Drum Recording

Figure 1:
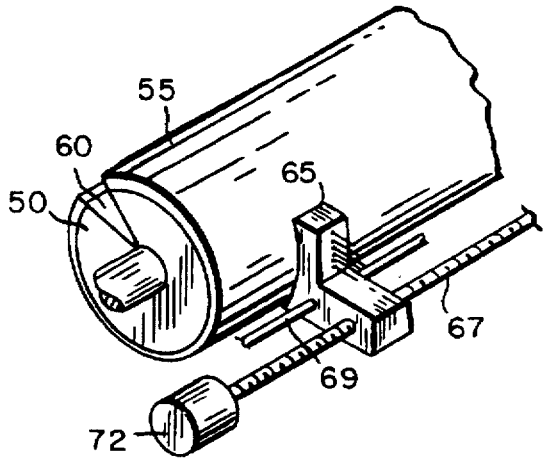
FIG. 1 is an isometric view of the cylindrical embodiment of an imaging apparatus in accordance with the present invention, and which operates in conjunction with a diagonal-array writing array.

Refer first to FIG. 1 of the drawings, which illustrates the exterior drum embodiment of our imaging system. The assembly includes a cylinder 50 around which is wrapped a lithographic plate blank 55. Cylinder 50 includes a void segment 60, within which the outside margins of plate 55 are secured by conventional clamping means (not shown). We note that the size of the void segment can vary greatly depending on the environment in which cylinder 50 is employed.

If desired, cylinder 50 is straightforwardly incorporated into the design of a conventional lithographic press, and serves as the plate cylinder of the press. In a typical press construction, plate 55 receives ink from an ink train, whose terminal cylinder is in rolling engagement with cylinder 50. The latter cylinder also rotates in contact with a blanket cylinder, which transfers ink to the recording medium. The press may have more than one such printing assembly arranged in a linear array. Alternatively, a plurality of assemblies may be arranged about a large central impression cylinder in rolling engagement with all of the blanket cylinders.

The recording medium is mounted to the surface of the impression cylinder, and passes through the nip between that cylinder and each of the blanket cylinders. Suitable central-impression and in-line press configurations are described in U.S. Pat. No. 5,163,368 (commonly owned with the present application and hereby incorporated by reference) and the '075 patent.

Figure 2:
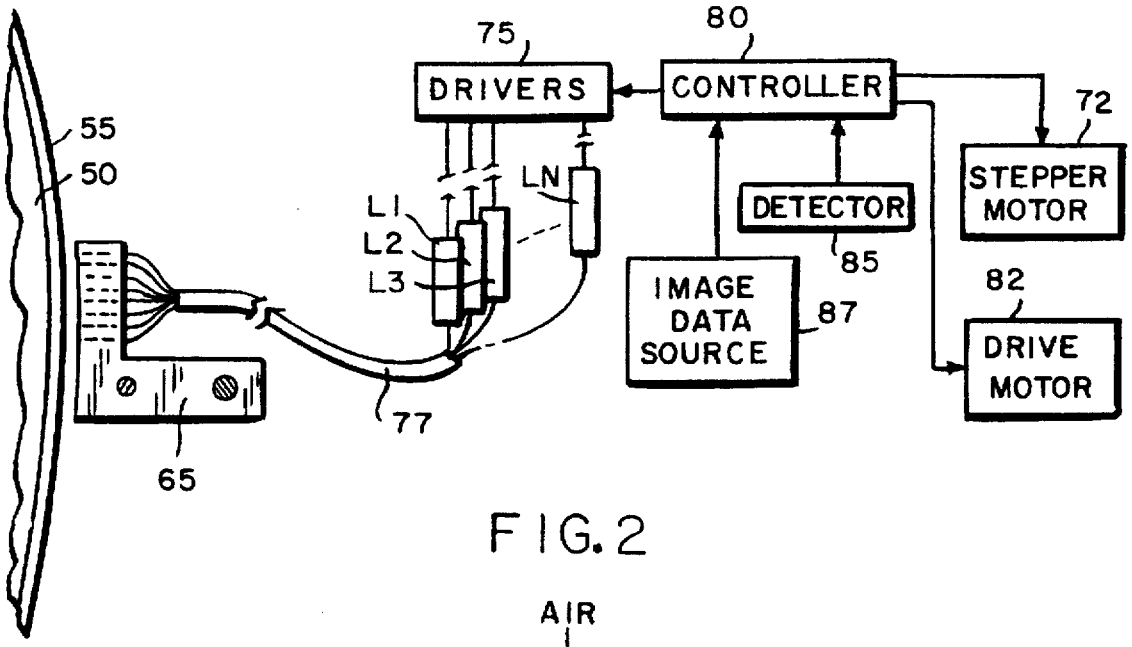
FIG. 2 is a schematic depiction of the embodiment shown in FIG. 1, and which illustrates in greater detail its mechanism of operation.

Cylinder 50 is supported in a frame and rotated by a standard electric motor or other conventional means (illustrated schematically in FIG. 2). The angular position of cylinder 50 is monitored by a shaft encoder (see FIG. 4). A writing array 65, mounted for movement on a lead screw 67 and a guide bar 69, traverses plate 55 as it rotates. Axial movement of writing array 65 results from rotation of a stepper motor 72, which turns lead screw 67 and thereby shifts the axial position of writing array 55. Stepper motor 72 is activated during the time writing array 65 is positioned over void 60, after writing array 65 has passed over the entire surface of plate 55. The rotation of stepper motor 72 shifts writing array 65 to the appropriate axial location to begin the next imaging pass.

The axial index distance between successive imaging passes is determined by the number of imaging elements in writing array 65 and their configuration therein, as well as by the desired resolution. As shown in FIG. 2, a series of laser sources $L_1$, $L_2$, $L_3$ . . . $L_n$, driven by suitable laser drivers collectively designated by reference numeral 75 (and discussed in greater detail below), each provide output to a fiber-optic cable. The lasers are preferably gallium-arsenide models, although any high-speed lasers that emit in the near infrared region can be utilized advantageously.

The size of an image feature (i.e., a dot, spot or area) and image resolution can be varied in a number of ways. The laser pulse must be of sufficient power and duration to produce useful ablation for imaging; however, there exists an upper limit in power levels and exposure times above which further useful, increased ablation is not achieved. Unlike the lower threshold, this upper limit depends strongly on the type of plate to be imaged.

Variation within the range defined by the minimum and upper parameter values can be used to control and select the size of image features. In addition, so long as power levels and exposure times exceed the minimum, feature size can be changed simply by altering the focusing apparatus (as discussed below). The final resolution or print density obtainable with a given-sized feature can be enhanced by overlapping image features (e.g., by advancing the writing array an axial distance smaller than the diameter of an image feature). Image-feature overlap expands the number of gray scales achievable with a particular feature.

The final plates should be capable of delivering at least 1,000, and preferably at least 50,000 printing impressions. This requires fabrication from durable material, and imposes certain minimum power requirements on the laser sources. For a laser to be capable of imaging the plates described below, its power output should be at least 0.2 megawatt/in$^2$ and preferably at least 0.6 megawatt/in$^2$. Significant ablation ordinarily does not occur below these power levels, even if the laser beam is applied for an extended time.

Because feature sizes are ordinarily quite small—on the order of 0.5 to 2.0 mils—the necessary power intensities are readily achieved even with lasers having moderate output levels (on the order of about 1 watt); a focusing apparatus, as discussed below, concentrates the entire laser output onto the small feature, resulting in high effective energy densities.

The cables that carry laser output are collected into a bundle 77 and emerge separately into writing array 65. It may prove desirable, in order to conserve power, to maintain the bundle in a configuration that does not require bending above the fiber's critical angle of refraction (thereby maintaining total internal reflection); however, we have not found this necessary for good performance.

Also as shown in FIG. 2, a controller 80 actuates laser drivers 75 when the associated lasers reach appropriate points opposite plate 55, and in addition operates stepper motor 72 and the cylinder drive motor 82. Laser drivers 75 should be capable of operating at high speed to facilitate imaging at commercially practical rates. The drivers preferably include a pulse circuit capable of generating at least 40,000 laser-driving pulses/second, with each pulse being relatively short, i.e., on the order of 10–15 μsec (although pulses of both shorter and longer durations have been used with success). A suitable design is described below.

Controller 80 receives data from two sources. The angular position of cylinder 50 with respect to writing array 65 is constantly monitored by a detector 85 (described in greater detail below), which provides signals indicative of that position to controller 80. In addition, an image data source (e.g., a computer) also provides data signals to controller 80. The image data define points on plate 55 where image spots are to be written. Controller 80, therefore, correlates the instantaneous relative positions of writing array 65 and plate 55 (as reported by detector 85) with the image data to actuate the appropriate laser drivers at the appropriate times during scan of plate 55. The control circuitry required to implement this scheme is well-known in the scanner and plotter art; a suitable design is described in U.S. Pat. No. 5,174,205, commonly owned with the present application and hereby incorporated by reference.

Figure 3:
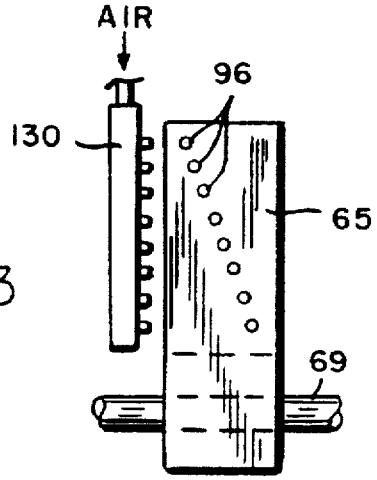
FIG. 3 is a front-end view of a writing array for imaging in accordance with the present invention, and in which imaging elements are arranged in a diagonal array.

The laser output cables terminate in lens assemblies, mounted within writing array 65, that precisely focus the beams onto the surface of plate 55. A suitable lens-assembly design is described below; for purposes of the present discussion, these assemblies are generically indicated by reference numeral 96. The manner in which the lens assemblies are distributed within writing array 65, as well as the design of the writing array, require careful design considerations. One suitable configuration is illustrated in FIG. 3. In this arrangement, lens assemblies 96 are staggered across the face of body 65. The design preferably includes an air manifold 130, connected to a source of pressurized air and containing a series of outlet ports aligned with lens assemblies 96. Introduction of air into the manifold and its discharge through the outlet ports cleans the lenses of debris during operation, and also purges fine-particle aerosols and mists from the region between lens assemblies 96 and plate surface 55.

The staggered lens design facilitates use of a greater number of lens assemblies in a single head than would be possible with a linear arrangement. And since imaging time depends directly on the number of lens elements, a staggered design offers the possibility of faster overall imaging. Another advantage of this configuration stems from the fact that the diameter of the beam emerging from each lens assembly is ordinarily much smaller than that of the focusing lens itself. Therefore, a linear array requires a relatively significant minimum distance between beams, and that distance may well exceed the desired printing density. This results in the need for a fine stepping pitch. By staggering the lens assemblies, we obtain tighter spacing between the laser beams and, assuming the spacing is equivalent to the desired print density, can therefore index across the entire axial width of the array. Controller 80 either receives image data already arranged into vertical columns, each corresponding to a different lens assembly, or can progressively sample, in columnar fashion, the contents of a memory buffer containing a complete bitmap representation of the image to be transferred. In either case, controller 80 recognizes the different relative positions of the lens assemblies with respect to plate 55 and actuates the appropriate laser only when its associated lens assembly is positioned over a point to be imaged.

Figure 4:
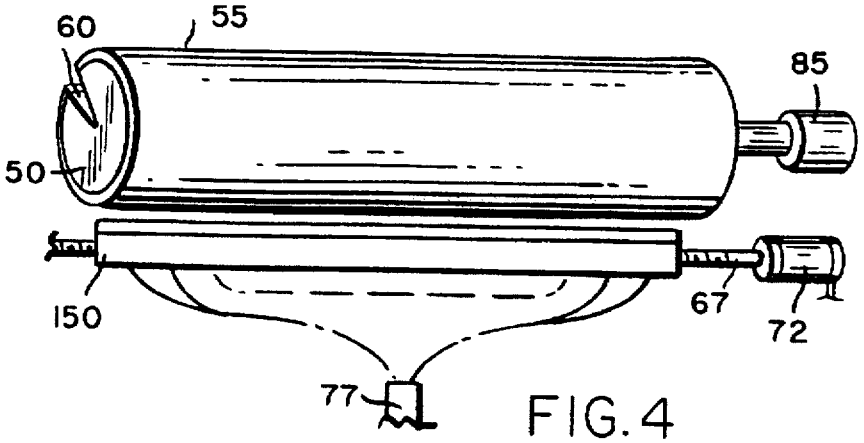
FIG. 4 is an isometric view of the cylindrical embodiment of an imaging apparatus in accordance with the present invention, and which operates in conjunction with a linear-array writing array.
Figure 5:
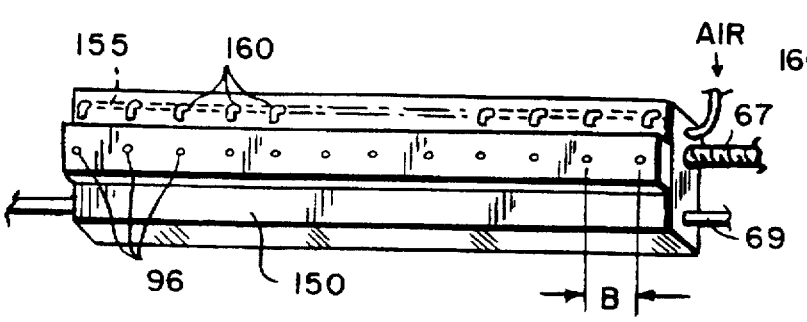
FIG. 5 is an isometric view of the front of a writing array for imaging in accordance with the present invention, and in which imaging elements are arranged in a linear array.
Figure 6:
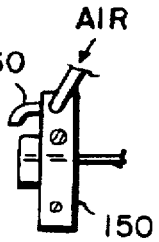
FIG. 6 is a side view of the writing array depicted in FIG. 5.

An alternative array design is illustrated in FIG. 4, which also shows the detector 85 mounted to the cylinder 50. Preferred detector designs are described in the '199 application. In this case the writing array, designated by reference numeral 150, comprises a long linear body fed by fiber-optic cables drawn from bundle 77. The interior of writing array 150, or some portion thereof, contains threads that engage lead screw 67, rotation of which advances writing array 150 along plate 55 as discussed previously. Individual lens assemblies 96 are evenly spaced a distance B from one another. Distance B corresponds to the difference between the axial length of plate 55 and the distance between the first and last lens assembly; it represents the total axial distance traversed by writing array 150 during the course of a complete scan. Each time writing array 150 encounters void 60, stepper motor 72 rotates to advance writing array 150 an axial distance equal to the desired distance between imaging passes (i.e., the print density). This distance is smaller by a factor of n than the distance indexed by the previously described embodiment (writing array 65), where n is the number of lens assemblies included in writing array 65.

Writing array 150 includes an internal air manifold 155 and a series of outlet ports 160 aligned with lens assemblies 96. Once again, these function to remove debris from the lens assemblies and imaging region during operation.

b. Flatbed Recording

Figure 7:
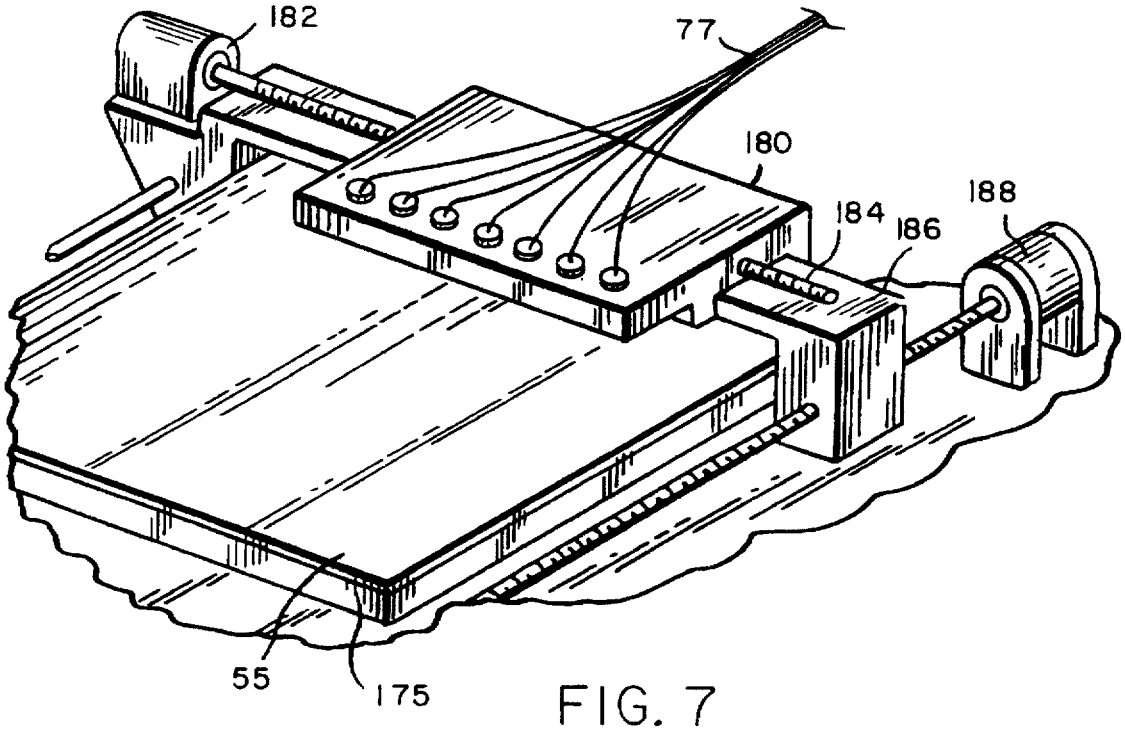
FIG. 7 is an isometric view of the flatbed embodiment of an imaging apparatus having a linear lens array.

The imaging apparatus can also take the form of a flatbed recorder, as depicted in FIG. 7. In the illustrated embodiment, the flatbed apparatus includes a stationary support 175, to which the outer margins of plate 55 are mounted by conventional clamps or the like. A writing array 180 receives fiber-optic cables from bundle 77, and includes a series of lens assemblies as described above. These are oriented toward plate 55.

A first stepper motor 182 advances writing array 180 across plate 55 by means of a lead screw 184, but now writing array 180 is stabilized by a bracket 186 instead of a guide bar. Bracket 180 is indexed along the opposite axis of support 175 by a second stepper motor 188 after each traverse of plate 55 by writing array 180 (along lead screw 184). The index distance is equal to the width of the image swath produced by imagewise activation of the lasers during the pass of writing array 180 across plate 55. After bracket 186 has been indexed, stepper motor 182 reverses direction and imaging proceeds back across plate 55 to produce a new image swath just ahead of the previous swath.

It should be noted that relative movement between writing array 180 and plate 155 does not require movement of writing array 180 in two directions. Instead, if desired, support 175 can be moved along either or both directions. It is also possible to move support 175 and writing array 180 simultaneously in one or both directions. Furthermore, although the illustrated writing array 180 includes a linear arrangement of lens assemblies, a staggered design is also feasible.

c. Interior-Arc Recording

Figure 8:
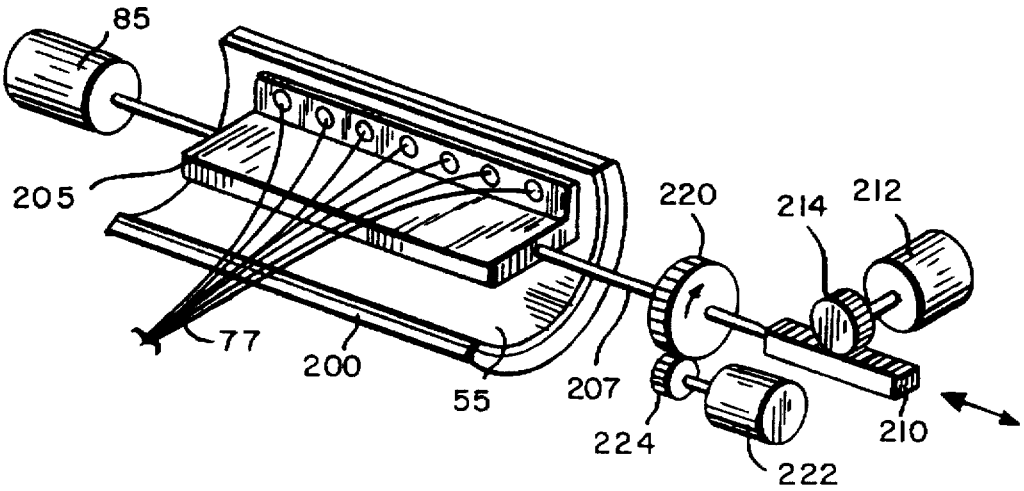
FIG. 8 is an isometric view of the interior-drum embodiment of an imaging apparatus having a linear lens array.

Instead of a flatbed, the plate blank can be supported on an arcuate surface as illustrated in FIG. 8. This configuration permits rotative, rather than linear movement of the writing array and/or the plate.

The interior-arc scanning assembly includes an arcuate plate support 200, to which a blank plate 55 is clamped or otherwise mounted. An L-shaped writing array 205 includes a bottom portion, which accepts a support bar 207, and a front portion containing channels to admit the lens assemblies. In the preferred embodiment, writing array 205 and support bar 207 remain fixed with respect to one another, and writing array 205 is advanced axially across plate 55 by linear movement of a rack 210 mounted to the end of support bar 207. Rack 210 is moved by rotation of a stepper motor 212, which is coupled to a gear 214 that engages the teeth of rack 210. After each axial traverse, writing array 205 is indexed circumferentially by rotation of a gear 220 through which support bar 207 passes and to which it is fixedly engaged. Rotation is imparted by a stepper motor 222, which engages the teeth of gear 220 by means of a second gear 224. Stepper motor 222 remains in fixed alignment with rack 210.

After writing array 205 has been indexed circumferentially, stepper motor 212 reverses direction and imaging proceeds back across plate 55 to produce a new image swath just ahead of the previous swath.

d. Output Guide and Lens Assembly

Figure 10:
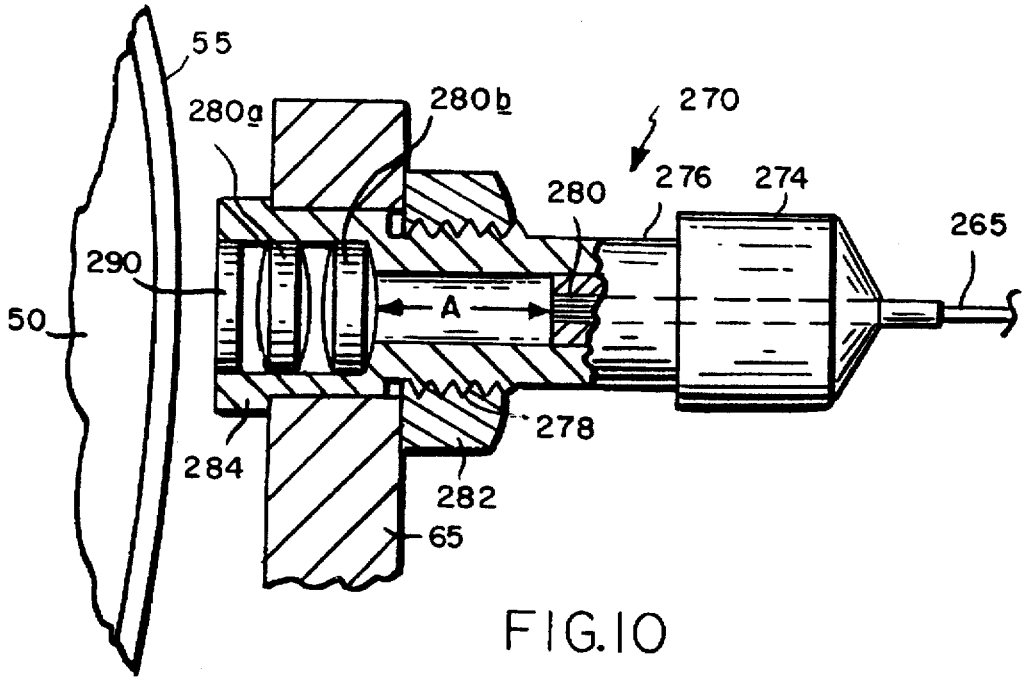
FIG. 10 is an enlarged, partial cutaway view of a lens element for focusing a laser beam from an optical fiber onto the surface of a printing plate.
Figure 9:
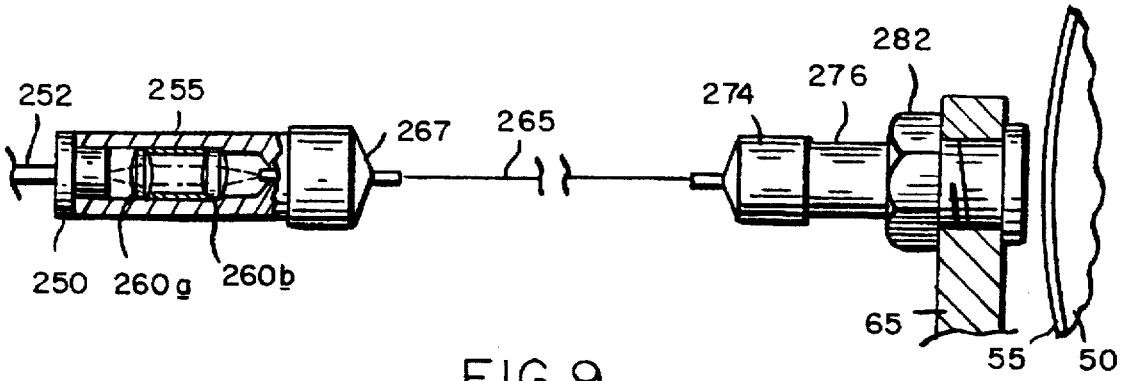
FIG. 9 is a cutaway view of a remote laser and beam-guiding system.
Figure 11:
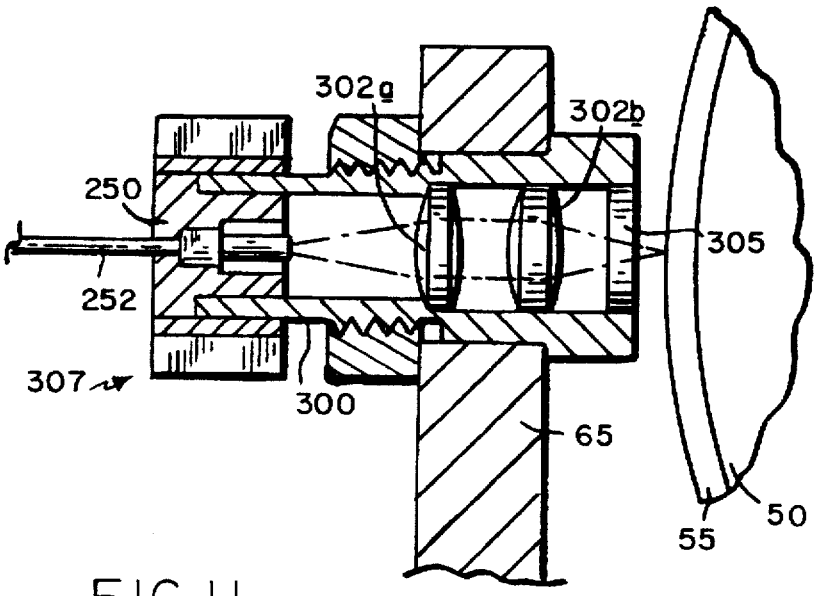
FIG. 11 is an enlarged, cutaway view of a lens element having an integral laser.

Suitable means for guiding laser output to the surface of a plate blank are illustrated in FIGS. 9–11. Refer first to FIG. 9, which shows a remote laser assembly that utilizes a fiber-optic cable to transmit laser pulses to the plate. In this arrangement a laser source 250 receives power via an electrical cable 252. Laser 250 is seated within the rear segment of a housing 255. Mounted within the forepart of housing are two or more focusing lenses 260a, 260b, which focus radiation emanating from laser 250 onto the end of a fiber-optic cable 265, which is preferably (although not necessarily) secured within housing 255 by a removable retaining cap 267. Cable 265 conducts the output of laser 250 to an output assembly 270, which is illustrated in greater detail in FIG. 10.

With reference to that figure, fiber-optic cable 265 enters the assembly 270 through a retaining cap 274 (which is preferably removable). Retaining cap 274 fits over a generally tubular body 276, which contains a series of threads 278. Mounted within the forepart of body 276 are two or more focusing lenses 280a, 280b. Cable 265 is carried partway through body 276 by a sleeve 280. Body 276 defines a hollow channel between inner lens 280b and the terminus of sleeve 280, so the end face of cable 265 lies a selected distance A from inner lens 280b. The distance A and the focal lengths of lenses 280a, 280b are chosen so that at normal working distance from plate 55, the beam emanating from cable 265 will be precisely focused on the plate surface. This distance can be altered to vary the size of an image feature.

Body 276 can be secured to writing array 65 in any suitable manner. In the illustrated embodiment, a nut 282 engages threads 278 and secures an outer flange 284 of body 276 against the outer face of writing array 65. The flange may, optionally, contain a transparent window 290 to protect the lenses from possible damage.

Alternatively, the lens assembly may be mounted within the writing array on a pivot that permits rotation in the axial direction (i.e., with reference to FIG. 10, through the plane of the paper) to facilitate fine axial positioning adjustment. We have found that if the angle of rotation is kept to 4° or less, the circumferential error produced by the rotation can be corrected electronically by shifting the image data before it is transmitted to controller 80.

Refer now to FIG. 11, which illustrates an alternative design in which the laser source irradiates the plate surface directly, without transmission through fiber-optic cabling. As shown in the figure, laser source 250 is seated within the rear segment of an open housing 300. Mounted within the forepart of housing 300 are two or more focusing lenses 302a, 302b, which focus radiation emanating from laser 250 onto the surface of plate 55. The housing may, optionally, include a transparent window 305 mounted flush with the open end, and a heat sink 307.

It should be understood that while the preceding discussion of imaging configurations and the accompanying figures have assumed the use of optical fibers, in each case the fibers can be eliminated through use of the embodiment shown in FIG. 11.

e. Driver Circuitry

Figure 12:
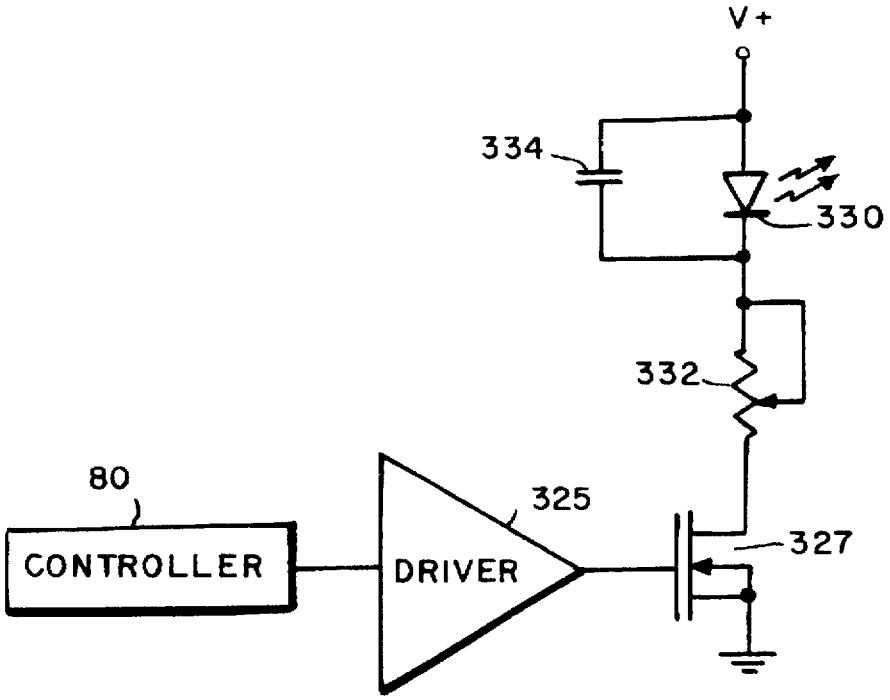
FIG. 12 is a schematic circuit diagram of a laser-driver circuit suitable for use with the present invention.

A suitable circuit for driving a diode-type (e.g., gallium arsenide) laser is illustrated schematically in FIG. 12. Operation of the circuit is governed by controller 80, which generates a fixed-pulse-width signal (preferably 5 to 20 μsec in duration) to a high-speed, high-current MOSFET driver 325. The output terminal of driver 325 is connected to the gate of a MOSFET 327. Because driver 325 is capable of supplying a high output current to quickly charge the MOSFET gate capacitance, the turn-on and turn-off times for MOSFET 327 are very short (preferably within 0.5 μsec) in spite of the capacitive load. The source terminal of MOSFET 327 is connected to ground potential. When MOSFET 327 is placed in a conducting state, current flows through and thereby activates a laser diode 330. A variable current-limiting resistor 332 is interposed between MOSFET 327 and laser diode 330 to allow adjustment of diode output. Such adjustment is useful, for example, to correct for different diode efficiencies and produce identical outputs in all lasers in the system, or to vary laser output as a means of controlling image size.

A capacitor 334 is placed across the terminals of laser diode 330 to prevent damaging current overshoots, e.g., as a result of wire inductance combined with low laser-diode inter-electrode capacitance.

2. Lithographic Printing Plates

Refer now to FIGS. 13A–13I, which illustrate various lithographic plate embodiments that can be imaged using the equipment heretofore described. The plate illustrated in FIG. 13A includes a substrate 400, a layer 404 capable of absorbing infrared radiation, and a surface coating layer 408.

Substrate 400 is preferably strong, stable and flexible, and may be a polymer film, or a paper or metal sheet. Polyester films (in the preferred embodiment, the MYLAR film product sold by E. I. dupont de Nemours Co. Wilmington, Del. or, alternatively, the MELINEX film product sold by ICI Films, Wilmington, Del.) furnish useful examples. A preferred polyester-film thickness is 0.007 inch, but thinner and thicker versions can be used effectively. Aluminum is a preferred metal substrate. Paper substrates are typically "saturated" with polymerics to impart water resistance, dimensional stability and strength.

For additional strength, it is possible to utilize the approach described in U.S. Pat. No. 5,188,032 (the entire disclosure of which is hereby incorporated by reference). As discussed in that application, a metal sheet can be laminated either to the substrate materials described above, or instead can be utilized directly as a substrate and laminated to absorbing layer 404. Suitable metals, laminating procedures and preferred dimensions and operating conditions are all described in the '032 patent, and can be straightforwardly applied to the present context without undue experimentation.

The absorbing layer can consist of a polymeric system that intrinsically absorbs in the near-IR region, or a polymeric coating into which near-IR-absorbing components have been dispersed or dissolved.

Layers 400 and 408 exhibit opposite affinities for ink or an ink-abhesive fluid. In one version of this plate, surface layer 408 is a silicone polymer that repels ink, while substrate 400 is an oleophilic polyester or aluminum material; the result is a dry plate. In a second, wet-plate version, surface layer 408 is a hydrophilic material such as a polyvinyl alcohol (e.g., the Airvol 125 material supplied by Air Products, Allentown, Pa.), while substrate 400 is both oleophilic and hydrophobic.

Exposure of the foregoing construction to the output of one of our lasers at surface layer 408 weakens that layer and ablates absorbing layer 404 in the region of exposure. As noted previously, the weakened surface coating (and any debris remaining from destruction of the absorbing second layer) is removed in a post-imaging cleaning step.

Alternatively, the constructions can be imaged from the reverse side, i.e., through substrate 400. So long as that layer is transparent to laser radiation, the beam will continue to perform the functions of ablating absorbing layer 404 and weakening surface layer 408. Although this "reverse imaging" approach does not require significant additional laser power (energy losses through a substantially transparent substrate 400 are minimal), it does affect the manner in which the laser beam is focused for imaging. Ordinarily, with surface layer 408 adjacent the laser output, its beam is focused onto the plane of surface layer 408. In the reverse-imaging case, by contrast, the beam must project through the medium of substrate 400 before encountering absorbing layer 404. Therefore, not only must the beam be focused on the surface of an inner layer (i.e., absorbing layer 404) rather than the outer surface of the construction, but that focus must also accommodate refraction of the beam caused by its transmission through substrate 400.

Because the plate layer that faces the laser output remains intact during reverse imaging, this approach prevents debris generated by ablation from accumulating in the region between the plate and the laser output. Another advantage of reverse imaging is elimination of the requirement that surface layer 408 efficiently transmit laser radiation. Surface layer 408 can, in fact, be completely opaque to such radiation so long as it remains vulnerable to degradation and subsequent removal.

EXAMPLES 1–7

These examples describe preparation of positive-working dry plates that include silicone coating layers and polyester substrates, which are coated with nitro-cellulose materials to form the absorbing layers. The nitrocellulose coating layers include thermoset-cure capability and are produced as follows:

| Component | Parts |
|---|---|
| Nitrocellulose | 14 |
| Cymel 303 | 2 |
| 2-Butanone (methyl ethyl ketone) | 236 |

The nitrocellulose utilized was the 30% isopropanol wet 5–6 Sec RS Nitrocellulose supplied by Aqualon Co., Wilmington, Del. Cymel 303 is hexamethoxymethylmelamine, supplied by American Cyanamid Corp.

An IR-absorbing compound is added to this base composition and dispersed therein. Use of the following seven compounds in the proportions that follow resulted in production of useful absorbing layers:

| | Example | | | | | | |
|---|---|---|---|---|---|---|---|
| | 1 | 2 | 3 | 4 | 5 | 6 | 7 |
| Component | Parts | | | | | | |
| Base Composition | 252 | 252 | 252 | 252 | 252 | 252 | 252 |
| NaCure 2530 | 4 | 4 | 4 | 4 | 4 | 4 | 4 |
| Vulcan XC-72 | 4 | — | — | — | — | — | — |
| Titanium Carbide | — | 4 | — | — | — | — | — |
| Silicon | — | — | 6 | — | — | — | — |
| Heliogen Green L 8730 | — | — | — | 8 | — | — | — |
| Nigrosine Base NG-1 | — | — | — | — | 8 | — | — |
| Tungsten Oxide | — | — | — | — | — | 20 | — |
| Vanadium Oxide | — | — | — | — | — | — | 10 |

NaCure 2530, supplied by King Industries, Norwalk, Conn., is an amine-blocked p-toluenesulfonic acid solution in an isopropanel/methanol blend. Vuclan XC-72 is a conductive carbon black pigment supplied by the Special Blacks Division of Cabot Corp., Waltham, Mass. The titanium carbide used in Example 2 was the Cerex submicron TiC powder supplied by Baikowski International Corp., Charlotte, N.C. Heliogen Green L 8730 is a green pigment supplied by BASF Corp., Chemicals Division, Holland, Mich. Nigrosine Base NG-1 is supplied as a powder by N H Laboratories, Inc., Harrisburg, Pa. The tungsten oxide ($WO_{2.9}$) and vanadium oxide ($V_6O_{13}$) used above are supplied as powders by Cerac Inc., Milwaukee, Wis.

Following addition of the IR absorber and dispersion thereof in the base composition, the blocked PTSA catalyst was added, and the resulting mixtures applied to the polyester substrate using a wire-wound rod. After drying to remove the volatile solvent(s) and curing (1 min at 300° F. in a lab convection oven performed both functions), the coatings were deposited at 1 g/m$^2$.

The nitrocellulose thermoset mechanism performs two functions, namely, anchorage of the coating to the polyester substrate and enhanced solvent resistance (of particular concern in a pressroom environment).

The following silicone coating was applied to each of the anchored IR-absorbing layers produced in accordance with the seven examples described above.

| Component | Parts |
|---|---|
| PS-445 | 22.56 |
| [PC-072 | .70] |
| *PC-072* | *.04* |

-continued

| Component | Parts |
|---|---|
| VM&P Naphtha | 76.70 |
| [Syl-Off 7367 | .04] |
| *Syl-Off 7367* | *.70* |

(These components are described in greater detail, and their sources indicated, in the '032 patent and also in U.S. Pat. Nos. 5,212,048 and 5,310,869, both commonly owned with the present invention and hereby incorporated by reference; these patents describe numerous other silicone formulations useful as the material of an oleophobic layer 408.)

We applied the mixture using a wire-wound rod, then dried and cured it to produce a uniform coating deposited at 2 g/m$^2$. The plates are then ready to be imaged.

EXAMPLES 8–9

The following examples describe preparation of a plate using an aluminum substrate.

| | Example | |
|---|---|---|
| | 8 | 9 |
| Component | Parts | |
| Ucar Vinyl VMCH | 10 | 10 |
| Vulcan XC-72 | 4 | — |
| Cymel 303 | — | 1 |
| NaCure 2530 | — | 4 |
| 2-Butanone | 190 | 190 |

Ucar Vinyl VMCH is a carboxy-functional vinyl terpolymer supplied by Union Carbide Chemicals & Plastics Co., Danbury, Conn.

In both examples, we coated a 5-mil aluminum sheet (which had been cleaned and degreased) with one of the above coating mixtures using a wire-wound rod, and then dried the sheets for 1 min at 300° F. in a lab convection oven to produce application weights of 1.0 g/m$^2$ for Example 8 and 0.5 g/m$^2$ for Example 9.

For Example 8, we overcoated the dried sheet with the silicone coating described in the previous examples to produce a dry plate.

Figure 13A:
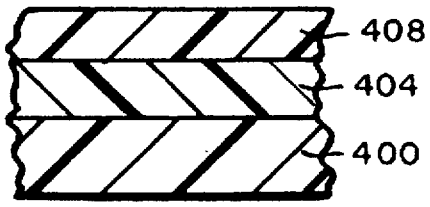
FIGS. 13A–13I are enlarged sectional views showing lithographic plates imageable in accordance with the present invention.
Figure 13B:
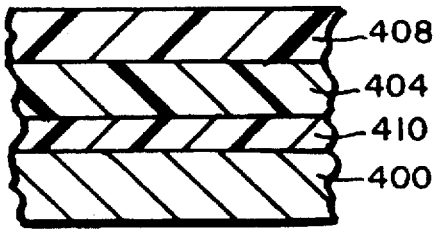

For Example 9, the coating described above served as a primer (shown as layer 410 in FIG. 13B). Over this coating we applied the absorbing layer described in Example 1, and we then coated this absorbing layer with the silicone coating described in the previous examples. The result, once again, is a useful dry plate with the structure illustrate in FIG. 13B.

EXAMPLE 10

Another aluminum plate is prepared by coating an aluminum 7-mil "full hard" 3003 alloy (supplied by All-Foils, Brooklyn Heights, Ohio) substrate with the following formulation (based on an aqueous urethane polymer dispersion) using a wire-wound rod:

| Component | Parts |
|---|---|
| NeoRez R-960 | 65 |
| Water | 28 |
| Ethanol | 5 |
| Cymel 385 | 2 |

NeoRez R-960, supplied by ICI Resins US, Wilmington, Mass., is an aqueous urethane polymer dispersion. Cymel 385 is a high-methylol-content hexamethoxymethylmelamine, supplied by American Cyanamid Corp.

The applied coating is dried for 1 min at 300° F. to produce an application weight of 1.0 g/m$^2$. Over this coating, which serves as a primer, we applied the absorbing layer described in Example 1 and dried it to produce an application weight of 1.0 g/m$^2$. We then coated this absorbing layer with the silicone coating described in the previous examples to produce a useful dry plate.

Although it is possible to avoid the use of a priming layer, as was done in Example 8, the use of primers has achieved wide commercial acceptance. Photosensitive dry plates are usually produced by priming an aluminum layer, and then coating the primed layer with a photosensitive layer and then a silicone layer. We expect that priming approaches used in conventional lithographic plates would also serve in the present context.

EXAMPLES 11–12

In the following examples, we prepared absorbing layers from conductive polymer dispersions known to absorb in the near-IR region. Once again, these layers were formulated to adhere to a polyester film substrate, and were overcoated with a silicone coating to produce positive-working, dry printing plates.

| Component | Example 11 | Example 12 |
|---|---|---|
| | Parts | |
| 5% ICP-117 in Ethyl Acetate | 200 | — |
| 5–6 Sec RS Nitrocellulose | 8 | — |
| Americhem Green #34384-C3 | — | 100 |
| 2-Butanone | — | 100 |

The ICP-117 is a proprietary polypyrrole-based conductive polymer supplied by Polaroid Corp. Commercial Chemicals, Assonet, Mass. Americhem Green #34384-C3 is a proprietary polyaniline-based conductive coating supplied by Americhem, Inc., Cuyahoga Falls, Ohio.

The mixtures were each applied to a polyester film using a wire-wound rod and dried to produce a uniform coating deposited at 2 g/m$^2$.

EXAMPLES 13–14

These examples illustrate use of absorbing layers containing IR-absorbing dyes rather than pigments. Thus, the nigrosine compound present as a solid in Example 5 is utilized here in solubilized form.

| Component | Example 13 | Example 14 |
|---|---|---|
| | Parts | |
| 5–6 Sec RS Nitrocellulose | 14 | 14 |
| Cymel 303 | 2 | 2 |
| 2-Butanone | 236 | 236 |
| Project 900 NP | 4 | — |
| Nigrosine Oleate | — | 8 |
| Nacure 2530 | 4 | 4 |

Projet 900 NP is a proprietary IR absorber marketed by ICI Colours & Fine Chemicals, Manchester, United Kingdom. Nigrosine oleate refers to a 33% nigrosine solution in oleic acid supplied by N H Laboratories, Inc., Harrisburg, Pa.

The mixtures were each applied to a polyester film using a wire-wound rod and dried to produce a uniform coating deposited at 1 g/m$^2$. A silicone layer was applied thereto to produce a working plate.

Substitutions may be made in all of the foregoing Examples 1–14. For instance, the melamine-formaldehyde crosslinker (Cymel 303) can be replaced with any of a variety of isocyanate-functional compounds, blocked or otherwise, that impart comparable solvent resistance and adhesion properties; useful substitute compounds include the Desmodur blocked polyisocyanate compounds supplied by Mobay Chemical Corp., Pittsburgh, Pa. Grades of nitrocellulose other than the one used in the foregoing examples can also be advantageously employed, the range of acceptable grades depending primarily on coating method.

EXAMPLES 15–16

These examples provide coatings based on polymers other than nitrocellulose, but which adhere to polyester film and can be overcoated with silicone to produce dry plates.

| Component | Example 15 | Example 16 |
|---|---|---|
| | Parts | |
| Ucar Vinyl VAGH | 10 | — |
| Saran F-310 | — | 10 |
| Vulcan XC-72 | 4 | — |
| Nigrosine Base NG-1 | — | 4 |
| 2-Butanone | 190 | 190 |

Ucar Vinyl VAGH is a hydroxy-functional vinyl terpolymer supplied by Union Carbide Chemicals & Plastics Co., Danbury, Conn. Saran F-310 is a vinylidenedichloride-acrylonitrile copolymer supplied by Dow Chemical Co., Midland, Mich.

The mixtures were each applied to a polyester film using a wire-wound rod and dried to produce a uniform coating deposited at 1 g/m$^2$. A silicone layer was applied thereto to produce a working dry plate.

To produce a wet plate, the polyvinylidenedichloride-based polymer of Example 16 is used as a primer and coated onto the coating of Example 1 as follows:

| Component | Parts |
|---|---|
| Saran F-310 | 5 |
| 2-Butanone | 95 |

The primer is prepared by combining the foregoing ingredients and is applied to the coating of Example 1 using a wire-wound rod. The primed coating is dried for 1 min at 300° F. in a lab convection oven for an application weight of 0.1 g/m$^2$.

A hydrophilic plate surface coating is then created using the following polyvinyl alcohol solution:

| Component | Parts |
|---|---|
| Airvol 125 | 5 |
| Water | 95 |

Airvol 125 is a highly hydrolyzed polyvinyl alcohol supplied by Air Products, Allentown, Pa.

This coating solution is applied with a wire-wound rod to the primed, coated substrate, with is dried for 1 min at 300°

F. in a lab convection oven. An application weight of 1 g/m$^2$ yields a wet printing plate capable of approximately 10,000 impressions.

It should be noted that polyvinyl alcohols are typically produced by hydrolysis of polyvinyl acetate polymers. The degree of hydrolysis affects a number of physical properties, including water resistance and durability. Thus, to assure adequate plate durability, the polyvinyl alcohols used in the present invention reflect a high degree of hydrolysis as well as high molecular weight. Effective hydrophilic coatings are sufficiently crosslinked to prevent redissolution as a result of exposure to fountain solution, but also contain fillers to produce surface textures that promote wetting. Selection of an optimal mix of characteristics for a particular application is well within the skill of practitioners in the art.

EXAMPLE 17

The polyvinyl-alcohol surface-coating mixture described immediately above is applied directly to the anchored coating described in Example 16 using a wire-wound rod, and is then dried for 1 min at 300° F. in a lab convection oven. An application weight of 1 g/m$^2$ yields a wet printing plate capable of approximately 10,000 impressions.

Various other plates can be fabricated by replacing the Nigrosine Base NG-1 of Example 16 with carbon black (Vulcan XC-72) or Heliogen Green L 8730.

EXAMPLE 18

A layer of titanium oxide (TiO) was sputtered onto a polyester film to a thickness of 600 Å and coated with silicone. The result was a nearly transparent, imageable dry plate.

Figure 13C:
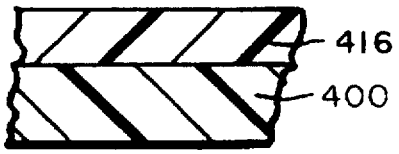

Refer now to FIG. 13C, which illustrates a two-layer plate embodiment including a substrate 400 and a surface layer 416. In this case, surface layer 416 absorbs infrared radiation. Our preferred dry-plate variation of this embodiment includes a silicone surface layer 416 that contains a dispersion of IR-absorbing pigment or dye. We have found that many of the surface layers described in U.S. Pat. Nos. 5,109,771, 5,165,345, and 5,249,525 (all commonly owned with the present application and all of which are hereby incorporated by reference), which contain filler particles that assist the spark-imaging process, can also serve as an IR-absorbing surface layer. In fact, the only filler pigments totally unsuitable as IR absorbers are those whose surface morphologies result in highly reflective surfaces. Thus, white particles such as $TiO_2$ and ZnO, and off-white compounds such as $SnO_2$, owe their light shadings to efficient reflection of incident light, and prove unsuitable for use.

Among the particles suitable as IR absorbers, direct correlation does not exist between performance in the present environment and the degree of usefulness as a spark-discharge plate filler. Indeed, a number of compounds of limited advantage to spark-discharge imaging absorb IR radiation quite well. Semiconductive compounds appear to exhibit, as a class, the best performance characteristics for the present invention. Without being bound to any particular theory or mechanism, we believe that electrons energetically located in and adjacent to conducting bands are readily promoted into and within the band by absurbing IR radiation, a mechanism in agreement with the known tendency of semiconductors to exhibit increased conductivity upon heating due to thermal promotion of electrons into conducting bands.

Currently, it appears that metal borides, carbides, nitrides, carbonitrides, bronze-structured oxides, and oxides structurally related to the bronze family but lacking the A component (e.g., $WO_{2.9}$) perform best.

Figure 13D:
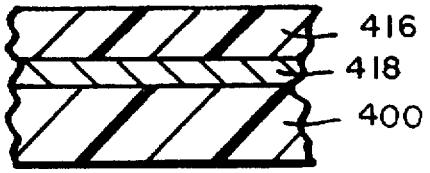

IR absorption can be further improved by adding an IR-reflective surface below the IR-absorbing layer (which may be layer 404 or layer 416). This approach provides maximum improvement to embodiments in which the absorbing layer is partially transmissive, and therefore fails to absorb a sufficient proportion of incident energy. FIG. 13D illustrates introduction of a reflective layer 418 between layers 416 and 400. To produce a dry plate having this layer, a thin layer of reflective metal, preferably aluminum of thickness ranging from 200 to 700 Å or thicker, is deposited by vacuum evaporation or sputtering directly onto substrate 400; suitable means of deposition, as well as alternative materials, are described in connection with layer 178 of FIG. 4F in the '075 patent mentioned earlier. The silicone coating is then applied to layer 418 in the same manner described above. Exposure to the laser beam results in ablation of layer 418. In a similar fashion, a than metal layer can be interposed between layers 404 and 400 of the plate illustrated in FIG. 13A.

Because this layer is not ablated, its proper thickness is determined primarily by transmission characteristics and the need to function as a printing surface. Layer 418 should reflect almost all radiation incident thereon. To support dry printing, the metal layer (which is exposed at image points where the overlying IR-absorbing layer is removed) accepts ink; to support wet printing, the metal layer exhibits sufficiently low affinity for fountain solution that ink will displace it when applied. Aluminum, we have found, provides both of these properties, and can therefore be used in wet-plate and dry-plate constructions. Those skilled in the art will appreciate the usefulness of a wide variety of metals and alloys as alternatives to aluminum; such alternatives include nickel and copper.

Figure 13E:
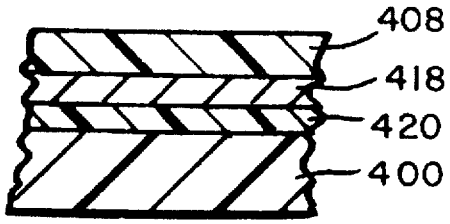
Figure 13F:
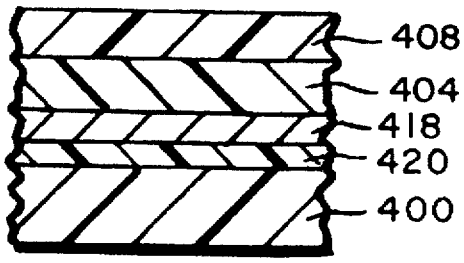
Figure 13G:
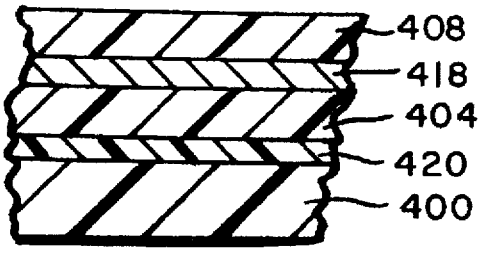
Figure 13I:
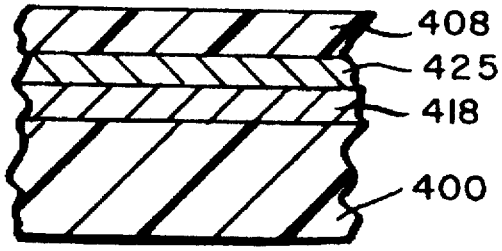

In a highly advantageous variation of this embodiment, illustrated in FIG. 13I, the metal layer is transformed into an ablation layer by the addition thereover of a thin layer of an IR-absorptive metal oxide. A preferred construction of this type includes a substrate 400 (e.g., 7-mil Mylar D film or a metal sheet); a layer 418 of metal deposited thereon; a metal-oxide layer 425 deposited onto metal layer 418; and a surface layer 408, which may be receptive to fountain solution (e.g., polyvinyl alcohol) or ink-repellent (e.g., silicone). Metal layer 418 is preferably aluminum, approximately 700 Å thick and exhibiting conductivity in the range of 1.5–1.7 mhos. Metal-oxide layer 425 is preferably titanium oxide (TiO), although other IR-absorptive materials (e.g., oxides of vanadium, manganese, iron or cobalt) can instead be used. Layer 425 is deposited (e.g., by sputtering) to a thickness of 100–600 Å, with preferred thicknesses ranging from 200–400 Å.

In operation, metal-oxide layer 425 becomes sufficiently hot upon exposure to IR radiation to ignite metal layer 418, which ablates along with layer 425. We have found that the resulting thermal discharge is intense enough to weaken the overlying surface layer 408, thereby easing the removal of that layer following imaging.

In a second variation of the construction shown in FIG. 13D, the reflecting layer is itself the substrate, resulting once again in the construction illustrated in FIG. 13C. A preferred construction of this sort includes an IR-absorbing layer 416 coated directly onto a polished aluminum substrate having a thickness from 0.004 to 0.02 inch. Once again, pure aluminum can be replaced with an aluminum alloy or a different metal (or alloy) entirely, so long as the criteria of sturdiness, reflectivity and suitability as a printing surface are maintained. Furthermore, instead of directly coating layer 416 onto substrate 400, the two layers can be laminated together as described in the '032 patent (so long as the laminating adhesive can be removed by laser ablation).

one can also employ, as an alternative to a metal reflecting layer, a layer containing a pigment that reflects IR radiation. Once again, such a layer can underlie layer 408 or 416, or may serve as substrate 400. A material suitable for use as an IR-reflective substrate is the white 329 film supplied by ICI Films, Wilmington, Del., which utilizes IR-reflective barium sulfate as the white pigment.

Silicone coating formulations particularly suitable for deposition onto an aluminum layer are described in the '032 patent and the '048 patent. In particular, commercially prepared pigment/gum dispersions can be advantageously utilized in conjunction with a second, lower-molecular-weight second component.

EXAMPLES 19–21

In the following coating examples, the pigment/gum mixtures, all based on carbon-black pigment, are obtained from Wacker Silicones Corp., Adrian, Mich. In separate procedures, coatings are prepared using PS-445 and dispersions marketed under the designations C-968, C-1022 and C-1190 following the procedures outlined in the '032 and '048 patents. The following formulations are utilized to prepare stock coatings:

| Order of Addition | Component | Weight Percent |
|---|---|---|
| 1 | VM&P Naphtha | 74.8 |
| 2 | PS-445 | 15.0 |
| 3 | Pigment/Gum Dispersion | 10.0 |
| 4 | Methyl Pentynol | 0.1 |
| 5 | PC-072 | 0.1 |

Coating batches are then prepared as described in the '032 and '048 patents using the following proportions:

| Component | Parts |
|---|---|
| Stock Coating | 100 |
| VM&P Naphtha | 100 |
| PS-120 (Part B) | 0.6 |

The coatings are straightforwardly applied to aluminum layers, and contain useful IR-absorbing material.

We have also found that a metal layer disposed as illustrated in FIG. 13D can, if made thin enough, support imaging by absorbing, rather than reflecting, IR radiation. This approach is valuable both where layer 416 absorbs IR radiation (as contemplated in FIG. 13D) or is transparent to such radiation. In the former case, the very thin metal layer provides additional absorptive capability (instead of reflecting radiation back into layer 416); in the later case, this layer functions as does layer 404 in FIG. 13A. Furthermore, this type of construction exhibits substantial flexibility, and is therefore well-suited to plate-winding arrangements. Appropriate metal layers are appreciably thinner than the 200≧700 Å thickness useful in a fully reflective layer.

Because such a thin metal layer may be discontinuous, it can be useful to add an adhesion-promoting layer to better anchor the surface layer to the other (non-metal) plate layers. Inclusion of such a layer is illustrated in FIG. 13E. This construction contains a substrate 400, the adhesion-promoting layer 420 thereon, a thin metal layer 418, and a surface layer 408. Suitable adhesion-promoting layers, sometimes termed print or coatability treatments, are furnished with various polyester films that may be used as substrates. For example, the J films marketed by E. I. dupont de Nemours Co., Wilmington, Del., and Melinex 453 sold by ICI Films, Wilmington, Del. serve adequately as layers 400 and 420. Generally, layer 420 will be very thin (on the order of 1 micron or less in thickness) and, in the context of a polyester substrate, will be based on acrylic or polyvinylidene chloride systems.

In a particularly preferred construction of this type, at least one very thin (preferably 200 Å or less) layer of a metal, preferably titanium, is deposited onto a polyester substrate 400 and coated with an oleophobic material (e.g., a fluoropolymer or, preferably, silicone) or a hydrophilic material (e.g., a polyvinyl alcohol). Once again, exposure of this construction to a laser pulse ablates the thin metal layer and weakens the topmost layer and destroys its anchorage, rendering it easily removed. The detached topmost layer (and any debris remaining from destruction of the absorptive second layer) is removed in a post-imaging cleaning step.

Preferred polyester films for use in this embodiment have surfaces to which the deposited metal adheres well, and exhibit substantial flexibility to facilitate spooling and winding over the surface of a plate cylinder. One useful class of preferred polyester material is the unmodified film exemplified by the dupont MYLAR D and MYLAR A products, and the 3930 film product marketed by Hoechst-Celanese, Greer, S.C. Also advantageous, depending on the metal employed, are polyester materials that have been modified to enhance surface adhesion characteristics as described above. The modified surface accepts metal with greater ease than an unmodified surface. Suitable polyesters of this type include the ICI 453 product.

For traditional applications involving plates that are individually mounted to the plate cylinder of a press, the adhesion-promoting surface can also (or alternatively) be present on the side of the polyester film in contact with the cylinder. Plate cylinders are frequently fabricated from material with respect to which the adhesion-promoting surface exhibits a high static coefficient of friction, reducing the possibility of plate slippage during actual printing. The ICI 561 product and the dupont MYLAR J102 film have adhesion-promoting coatings applied to both surfaces, and are therefore well-suited to this environment.

For applications involving automatic plate-material dispensing apparatus, however, the ease of winding the material around the cylinder represents an equally important consideration, and favors the use of materials having a low dynamic coefficients of friction with respect to the cylinder. Adhesion-promoting surfaces should not be used on the exterior polyester surface if the result is excessive resistance to movement. On the other hand, antistatic treatments can impart a beneficial reduction of resistance to movement with respect to many surfaces (compared with unmodified polyester). This is particularly true for plate constructions featuring semiconductive layers, which can accumulate static charges that retard free travel along the plate cylinder. Examples of antistatic polyester films include the dupont MYLAR JXM301 and JMX502 products; the latter film includes an adhesion-promoting treatment on its reverse side.

Ideally, and to the extent practicable, the cylinder and the polyester surface in contact with it are matched to provide low dynamic but high static coefficients of friction. For this reason, it is important to consider both the dynamic and static behavior of any surface treatment in conjunction with a particular type of plate cylinder, and to evaluate this behavior against an unmodified surface.

The metal layer 418 is preferably deposited to an optical density ranging from 0.2 to 1.0, with a density of 0.6 being especially preferred. However, thicker layers characterized by optical densities as high as 2.5 can also be used to advantage. This range of optical densities generally corresponds to a thickness of 200 Å or less. While titanium is preferred as layer 418, alternative metals include alloys of titanum, aluminum, alloys of aluminum, nickel, iron, chromiun, and others exhibiting the required optical densities and adequate radiation absorption.

Metals such as titanium may be conveniently applied by well-known deposition techniques such as sputtering, electron-beam evaporation and vacuum evaporation. Depending on the condition of the polyester surface, sputtering can prove particularly advantageous in the ready availability of coprocessing techniques (e.g., glow discharge and back sputtering) that can be used to modify polyester prior to deposition.

Depending on requirements relating to imaging speed and laser power, it may prove advantageous to provide the metal layer with an antireflective overlay to increase interaction with the imaging pulses. The refractive index of the antireflective material, in combination with that of the metal, creates interfacial conditions that favor laser penetration over reflection. Suitable antireflective materials are well-known in the art, and include a variety of dielectrics (e.g., metal oxides and metal halides). Materials amenable to application by sputtering can ease manufacture considerably, since both the metal and the antireflection coating can be applied in the same chamber by multiple-target techniques.

The coating layer 416 is preferably a silicone composition, for dry-plate constructions, or a polyvinyl alcohol composition in the case of a wet plate. Our preferred silicone formulation is that described earlier in connection with Examples 1–7, applied to produce a uniform coating deposited at 2 g/m$^2$. The anchorage of coating layer 416 to metal layer 418 can be improved by the addition of an adhesion promoter, such as a silane composition (for silicone coatings) or a titanate composition for polyvinyl-alcohol coatings.

Although the foregoing construction is well-suited to plate material intended for automatic-dispensing apparatus, it can also be utilized in composite laminated designs using relatively thin (e.g., 0.001–0.0045 inch) polyester films adhered to a stable metal support as described in the '032 patent.

With renewed reference to FIG. 13E, we note that it is also possible to add a near-IR absorbing layer to that construction in order to eliminate any need for IR-absorption capability in surface layer 408, but where a very thin metal layer alone provides insufficient absorptive capability. Refer now to FIG. 13F, which shows such a construction. An IR-absorbing layer 404, as described above, has been introduced below surface layer 408 and above very thin metal layer 418. Layers 404 and 418, both of which are ablated by laser radiation during imaging, cooperate to absorb and concentrate that radiation, thereby ensuring their own efficient ablation. For plates to be imaged in a reversed orientation, as described above, the relative positions of layers 418 and 404 can be reversed and layer 400 chosen so as to be transparent. Such an alternative is illustrated in FIG. 13G.

Any of a variety of production sequences can be used advantageously to prepare the plates shown in FIGS. 13A–13G. In one representative sequence, substrate 400 (which may be, for example, polyester or a conductive polycarbonate) is metallized to form reflective layer 418, and then coated with silicone or a fluoropolymer (either of which may contain a dispersion of IR-absorptive pigment) to form surface layer 408; these steps are carried out as described, for example, in the '345 patent in connection with FIGS. 4F and 4G.

Alternatively, one can add a barrier sheet to surface layer 408 and build up the remaining plate layers from that sheet. A barrier sheet can serve a number of useful functions in the context of the present invention. First, as described previously, those portions of surface layer 408 that have been weakened by exposure to laser radiation must be removed before the imaged plate can be used to print. Using a reverse-imaging arrangement, exposure of surface layer 408 to radiation can result in its molten deposition, or decaling, onto the inner surface of the barrier sheet; subsequent stripping of the barrier sheet then effects removal of superfluous portions of surface layer 408. A barrier sheet is also useful if the plates are to include metal bases (as described in the '032 patent), and are therefore created in bulk directly on a metal coil and stored in roll form; in that case surface layer 408 can be damaged by contact with the metal coil.

Figure 13H:
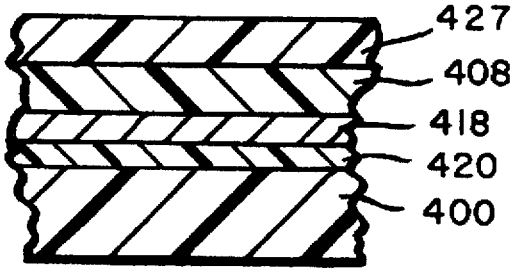

A representative construction that includes such a barrier layer, shown at reference numeral 427, is depicted in FIG. 13H; it should be understood, however, that barrier sheet 427 can be utilized in conjunction with any of the plate embodiments discussed herein. Barrier layer 427 is preferably smooth, only weakly adherant to surface layer 408, strong enough to be feasibly stripped by hand at the preferred thicknesses, and sufficiently heat-resistant to tolerate the thermal processes associated with application of surface layer 408. Primarily for economic reasons, preferred thicknesses range from 0.00025 to 0.002 inch. Our preferred material is polyester; however, polyolefins (such as polyethylene or polypropylene) can also be used, although the typically lower heat resistance and strength of such materials may require use of thicker sheets.

Barrier sheet 427 can be applied after surface layer 408 has been cured (in which case thermal tolerance is not important), or prior to curing; for example, barrier sheet 427 can be placed over the as-yet-uncured layer 408, and actinic radiation passed therethrough to effect curing.

One way of producing the illustrated construction is to coat barrier sheet 427 with a silicone material (which, as noted above, can contain IR-absorptive pigments) to create layer 408. This layer is then metallized, and the resulting metal layer coated or otherwise adhered to substrate 400. This approach is particularly useful to achieve smoothness of surface layers that contain high concentrations of dispersants which would ordinarily impart unwanted texture.

It will therefore be seen that we have developed a highly versatile imaging system and a variety of plates for use therewith. The terms and expressions employed herein are used as terms of description and not of limitation, and there is no intention, in the use of such terms and expressions, of excluding any equivalents of the features shown and described or portions thereof, but it is recognized that various modifications are possible within the scope of the invention claimed.

What is claimed is:

1. A lithographic printing member directly imageable by laser discharge, the member comprising:

a. a topmost first layer which is polymeric; and b. a thin metal layer underlying the first layer; and c. a substrate underlying the metal layer; wherein d. the metal layer is formed of a material which is subject to ablative absorption of imaging infrared radiation and the first layer is not; and e. the first layer *exhibits an affinity for an abhesive fluid for ink* and the substrate [exhibit different affinities for at least one printing liquid selected from the group consisting of ink and an abhesive fluid for ink] *exhibits an affinity for ink.*

2. The member of claim 1 wherein the metal is tintanium.

3. The member of claim 1 wherein the metal is selected from the group consisting of alloys of titanium, aluminum, alloys of aluminum, nickel, iron and chromium.

4. The member of claim 1 wherein the metal is deposited to a thickness of less than 200 Å.

5. The member of claim 1 wherein the metal is deposited to an optical density ranging from 0.2 to 1.0.

6. The member of claim 1 wherein the metal is deposited to an optical density of 2.5 or less.

7. The member of claim [1] *22* wherein the first layer is oleophobic.

[8. The member of claim 7 wherein the first layer is a silicone chemical species.]

9. The member of claim [8] *22* wherein the silicone is anchored to the metal layer by means of a silane adhesion promoter.

[10. The member of claim 1 wherein the first layer is hydrophobic.]

11. The member of claim [10] *1* wherein the first layer is a polyvinyl alcohol chemical species.

12. The member of claim 11 wherein the polyvinyl alcohol is anchored to the metal layer by means of a titanate adhesion promoter.

13. The member of claim 1 wherein the first layer is anchored to the metal layer by means of an adhesion promoter.

14. The member of claim 1 wherein the substrate comprises first and second surfaces, at least one of which has means to improve adhesion.

15. The member of claim 1 wherein the substrate comprises first and second surfaces, at least one of which has means to reduce static buildup.

16. The member of claim 1 wherein the substrate comprises first and second surfaces, the first has means to improve adhesion and the second surface has means to reduce static buildup.

17. The member of claim 1 further comprising an antireflective layer between the metal and first layers.

18. The member of claim 1 wherein the substrate is laminated to a metal support.

*19. The member of claim 1 wherein the substrate comprises a material that reflects imaging radiation.*

*20. The member of claim 19 wherein the material is IR-reflective barium sulfate.*

*21. The member of claim 20 wherein the substrate comprises a polyester polymer within which the barium sulfate is dispersed.*

*22. A lithographic printing member directly imageable by laser discharge, the member comprising:*

*a. a topmost first layer which is formed of an addition-cured silicone;*

*b. a thin metal layer underlying the first layer and formed of titanium or an alloy thereof; and*

*c. a substrate underlying the metal layer; wherein*

*d. the metal layer is subject to ablative absorption of imaging infrared radiation and the first layer is not; and*

*e. the first layer and the substrate exhibit different affinities for at least one printing liquid selected from the group consisting of ink and an abhesive fluid for ink.*

*23. The member of claim 22 wherein the metal is deposited to a thickness of less than 200 Å.*

*24. The member of claim 22 wherein the metal is deposited to an optical density ranging from 0.2 to 1.0.*

*25. The member of claim 22 wherein the metal is deposited to an optical density of 2.5 or less.*

*26. The member of claim 22 wherein the substrate comprises first and second surfaces, at least one of which has means to improve adhesion.*

*27. The member of claim 22 wherein the substrate comprises first and second surfaces, at least one of which has means to reduce static buildup.*

*28. The member of claim 22 wherein the substrate comprises first and second surfaces, the first has means to improve adhesion and the second surface has means to reduce static buildup.*

*29. The member of claim 22 further comprising an antireflective layer between the metal and first layers.*

*30. The member of claim 22 wherein the substrate is laminated to a metal support.*

*31. The member of claim 22 wherein the substrate comprises a material that reflects imaging radiation.*

*32. The member of claim 31 wherein the material is IR-reflective barium sulfate.*

*33. The member of claim 32 wherein the substrate comprises a polyester polymer within which the barium sulfate is dispersed.*

* * * * *